Feb. 2, 1954
H. P. DUPRE
2,668,280
DEAD-END SPLICE CONNECTOR
Filed Aug. 21, 1951
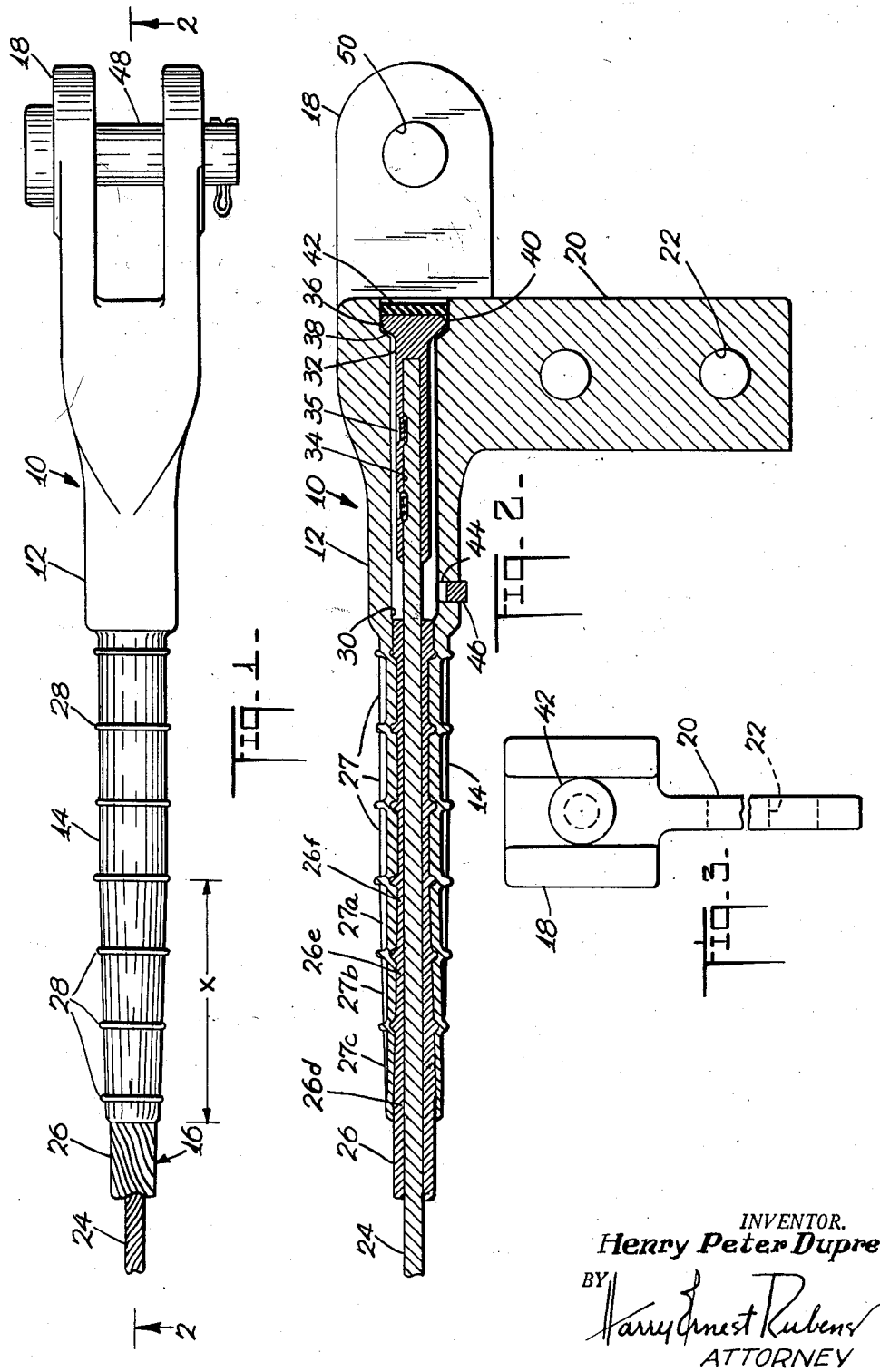
INVENTOR.
*Henry Peter Dupre*
BY
*Harry Ernest Rubens*
ATTORNEY Patented Feb. 2, 1954

2,668,280

UNITED STATES PATENT OFFICE 2,668,280

DEAD-END SPLICE CONNECTOR

Henry Peter Dupre, Croton-on-Hudson, N. Y., assignor to Burndy Engineering Company, Inc., a corporation of New York Application August 21, 1951, Serial No. 242,965

1 Claim. (Cl. 339—114)

This invention relates to cable connectors and more particularly to connectors for anchoring the ends of composite transmission line cables to a supporting structure.

It is common in high power transmission lines to use an outer stranded cable conductor made of metal having high electrical conductivity such as aluminum over a reinforcing core of steel. An example is the aluminum cable with steel reinforcement (A. C. S. R.).

In the past, anchorage for this type of transmission line has been provided by connectors having two concentric sleeves of different lengths, the outer sleeve attached to the sheath conductor and the inner sleeve attached to the core. In the dead-end type of connector each sleeve terminates at the free end of the cable in a clevis, one within the other. Oppositely positioned holes in each clevis are aligned to take an anchor pin which attaches each cable member through its respective clevis to a supporting structure.

This type of connector has many disadvantages. For example it is important in the use of composite cables for transmission lines that the stress on each member of the cable occur simultaneously to prevent an unbalanced strain. Each cable member being provided with its attached clevis must be aligned with one another, and therefore, a balanced stress is difficult to achieve. The solution to this problem is, therefore, the principal object of my invention.

Further, if a clevis is provided for both inner and outer cable members, there are four holes through which the anchor pin must be inserted. As the usual installation occurs on a transmission pole high above the ground and in an inconvenient position, it is awkward and time consuming to jockey the inner and outer clevises so that each pair of holes will be aligned to receive the anchor pin which is simultaneously secured to the eye on the usual strain insulator. A similar difficulty is encountered in removing the anchor pin where the uneven stress on the pin by the clevises causes it to stick until the holes are exactly aligned. Accordingly it is another object of my invention to eliminate the need for the double clevises hitherto regarded as necessary.

A further object seeks to minimize the corrosion and loss of conductivity that usually occurs in the prior art connectors by moisture seeping in between the core and the conductor through the space between the clevises.

Still other objects of my invention are to provide a connector which can be manufactured at a reduced cost by eliminating machining operations; which is labor saving during installation; and in which indentable connections are provided for attaching the cable members.

I accomplish these and other objects and obtain my new results as will be apparent from the device described in the following specification, particularly pointed out in the claim, and illustrated in the accompanying drawing, in which—

Fig. 1 is a longitudinal plan view of my dead-end splice connector into which a transmission cable has been inserted.

Fig. 2 is a longitudinal sectional view taken along line 2—2 of Fig. 1 showing the connector indented to the cable members; and Fig. 3 is an end view of the dead-end splice connector taken along line 3—3 of Fig. 2, and with the anchor pin removed.

In the drawing 10 designates a dead-end type of connector incorporating my invention and comprises a body member 12, made of electrically conducting metal, preferably cast aluminum, terminating at one end in a hollow tubular portion 14 adapted to receive the composite cable 16, and at the other end in a clevis portion 18 adapted to secure the connector to a supporting structure, such as a strain insulator, not shown.

A contact arm 20 laterally extends from the body 12 to provide connection for a jumper lead, not shown. The arm may be a bar provided with attaching holes 22, as illustrated, or formed into a sleeve for attachment to a wire conductor.

The cable 16 may be the conventional high strength transmission type of A. C. S. R. cable, consisting of a steel core member 24 and an aluminum sheath conductor member 26.

The tubular portion 14 of the body receives the sheath conductor member 26 and is attached thereto, preferably by indentation 27, the guide lines 28 being provided to assist the workman in positioning the indenting tool and prevent overlapping of the indentations.

A substantial length of the tubular portion may be tapered toward its free end, illustrated by the distance X in Fig. 1, by reducing its thickness. When the tubular portion is indented to the sheath conductor member, as shown in Fig. 2, the indentations 27a, 27b and 27c in the tubular portion diminish in depth as the free end of the tubular portion is approached, whereas the wall thickness of the sheath conductor will be greatest at the free end of the tubular portion indicated at 26d and smallest at 26f. The depth of the indentation on the sheath conductor member is substantially the same as the corresponding indentation on the tubular portion, with allowance made for any slight longitudinal flow of the metal.

The tapered construction has a two fold advantage. Firstly, the strain on the connector is redistributed so that the greatest strain is furthermost from the free end or mouth of the tubular portion, which is the weakest point as it is the point where the connector first takes the load. Secondly, the effect of cable vibration is reduced by gradually relieving the "notched effect." The tensile strength of the sheath conductor member is gradually transferred to the tubular portion progressively from the mouth of the tubular portion.

The body 12 of the connector is bored at 30 to house a steel cap 32 having a socket portion 34 for attachment to the steel core 24, preferably by indentions 35.

A head 36 on the steel cap bears against a beveled shoulder 38 in the countersunk hole 40 in the body 12 to support the tensioned steel core. A washer 42 may be provided of rubber, steel, plastic or the like, and press-fitted into the hole 40 to assist in the sealing of the metal-to-metal contact of the head and shoulder within the body against corrosion. An opening 44 having a filler plug 46 may be provided in the body leading to the bore 30 into which a protective compound is injected to prevent oxidation of the metal parts.

The cable connection is made by inserting the dead-end connector over the cable allowing the end of the cable to extend beyond the aperture 40. The end of the sheath conductor 26 is stripped along its length sufficiently to permit the end of the core 24 to fit within the socket 34 of the cap 32 and is secured therein. The connector is then pulled back over the cable until the head 36 of the cap abuts the shoulder 38, and the tubular portion 14 of the body is indented to the sheath conductor 26. Finally the washer 42 is inserted into the body and body and the bore 30 filled with the protective compound through insert hole 44. The connection can then be mounted to the supporting structure by means of an anchorage pin 48 fitting through apertures 50 in each leg of the clevis.

By providing a sleeve for the cable core and a means for anchoring the sleeve within the connector body, such as by the head 36 in engagement with the shoulder 38, I can eliminate a clevis which was hitherto found necessary for anchoring the coil. The elimination of this clevis is reflected in a substantial saving in the cost of production of the connection, for it has been hitherto necessary to forge the clevis and machine the holes to receive the pin. In addition, there is a substantial saving in labor required to make the connection because it is not necessary to align the holes in each clevis when the tubular portion 14 is indented to the sheath conductor. There is also a saving in the time hitherto consumed in inserting and removing the anchorage pin when making and separating the connection to the supporting structure. As the sleeve for the cable core terminates within the connector body, a simple and effective seal is possible.

While I have illustrated the invention in a dead-end connector, it is to be understood that it may be incorporated in a cable splice for splicing cables of this type together, wherein each cable forms the suporting structure for the other.

I have thus described my invention, but I desire it understood that it is not confined to the particular forms or uses shown and described, the same being merely illustrative, and that the invention may be carried out in other ways without departing from the spirit of my invention, and, therefore, I claim broadly the right to employ all equivalent instrumentalities coming within the scope of the appended claim, and by means of which, objects of my invention are attained and new results accomplished, as it is obvious that the particular embodiments herein shown and described are only some of the many that can be employed to attain these objects and accomplish these results.

I claim:

A terminal connection comprising a cable having inner and outer metal sections, a pair of concentric metal sleeves, each indented over a section of the cable and forming a compartment in-between sleeves for storing a sealing compound, said inner sleeve being secured to said inner cable section entirely within said compartment, said outer metal sleeve provided with a peripheral recess at one end thereof, said inner sleeve having a closed and enlarged end seated in said peripheral recess for supporting the inner cable section thereto and for closing the compartment between metal sleeves, and means for electrically and mechanically securing the outer metal cable section to a supporting structure.

HENRY PETER DUPRE.

References Cited in the file of this patent
UNITED STATES PATENTS

| Number | Name | Date |
| --- | --- | --- |
| 1,758,218 | Carlson | May 13, 1930 |
| 1,793,293 | Varney | Feb. 17, 1931 |
| 1,885,316 | Astley | Nov. 1, 1932 |
| 2,050,855 | Oppenheim | Aug. 11, 1936 |
| 2,244,696 | Hayden | June 10, 1941 |
| 2,262,802 | Hayden | Nov. 18, 1941 |
| 2,327,650 | Klein | Aug. 24, 1943 |
| 2,587,095 | Bergan | Feb. 26, 1952 |